United States Patent
Maki (10) Patent No.: US 9,948,532 B2
(45) Date of Patent: Apr. 17, 2018

(54) INFORMATION PROCESSING APPARATUS, INFORMATION PROCESSING METHOD, AND COMPUTER READABLE MEDIUM

(71) Applicant: Mitsubishi Electric Corporation, Tokyo (JP)

(72) Inventor: Kazuhiro Maki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 15/032,878

(22) PCT Filed: Dec. 11, 2013

(86) PCT No.: PCT/JP2013/083147
§ 371 (c)(1),
(2) Date: Apr. 28, 2016

(87) PCT Pub. No.: WO2015/087404
PCT Pub. Date: Jun. 18, 2015

(65) Prior Publication Data
US 2016/0254971 A1    Sep. 1, 2016

(51) Int. Cl.
*H04L 12/26* (2006.01)
*H04L 12/64* (2006.01)

(52) U.S. Cl.
CPC .......... *H04L 43/08* (2013.01); *H04L 12/6418* (2013.01); *H04L 43/04* (2013.01);
(Continued)

(58) Field of Classification Search
CPC ......... H04L 43/08; H04L 43/12; H04L 43/04; H04L 43/16; H04L 43/0882
See application file for complete search history.

(56) References Cited

U.S. PATENT DOCUMENTS

| 2008/0151757 A1* | 6/2008 | Matsubara | H04L 43/026 370/237 |
| 2011/0199924 A1* | 8/2011 | Breslin | H04L 43/0882 370/252 |

FOREIGN PATENT DOCUMENTS

| JP | 2003-244238 A | 8/2003 |
| JP | 2004-193991 A | 7/2004 |

(Continued)

OTHER PUBLICATIONS

CorvilNet, http://bizex.goo.ne.jp/release/detail/27538/, Nov. 5, 2011, 3 pages.
(Continued)

*Primary Examiner* — Mohammad S Anwar
(74) *Attorney, Agent, or Firm* — Birch, Stewart, Kolasch & Birch, LLP (57) ABSTRACT

A notification acquiring section receives, from a device, a notification message indicating at least one of an aggregate value of data communication amounts obtained by aggregating, per unit of aggregation time of one second or longer, the data communication amounts of the device which have been measured on a millisecond or microsecond basis; and an aggregate value of data accumulation amounts obtained by aggregating, per unit of the aggregation time, the data accumulation amounts in the device which have been measured on the millisecond or microsecond basis. A determining section analyzes at least one of the aggregate values of the data communication amounts and the data accumulation amounts indicated by the notification message to determine whether or not microburst traffic has occurred at the device.

8 Claims, 9 Drawing Sheets

(52) U.S. Cl.
CPC ...... *H04L 43/0829* (2013.01); *H04L 43/0882* (2013.01); *H04L 43/12* (2013.01); *H04L 43/16* (2013.01)

(56) References Cited

FOREIGN PATENT DOCUMENTS

| JP | 2010-141655 A | 6/2010 |
|----|---------------|--------|
| JP | 2010-245841 A | 10/2010 |
| JP | 2011-172014 A | 9/2011 |
| JP | 2013-9139 A | 1/2013 |
| JP | 2013-131817 A | 7/2013 |
| JP | 2013-168832 A | 8/2013 |

OTHER PUBLICATIONS

Matsuura et al., "A Bandwidth Allocation Method in ATM Networks", IE ICE Technical Report, Jan. 31, 1992, vol. 91, No. 456, pp. 55-60.

Shimizu, "Shoraimo ni Muketa FlexiblemNetwork Kosei Gijutsu Programmable Kokino Network 0 Sasaeru Sokutei Gijutsu", NTT Gijutsu Journal, Mar. 1, 2012, vol. 24, No. 3, pp. 28-32.

* cited by examiner

NOTIFICATION ACQUISITION TABLE

| TIME AND DATE | ITEM | VALUE | IP ADDRESS |
|---|---|---|---|
| 2013/10/16 15:00:00 | AMOUNT OF RECEIVED DATA | 82% | 192.168.1.100 |
| 2013/10/16 15:01:00 | NUMBER OF PACKETS IN BUFFER | 71% | 192.168.1.100 |
| ... | ... | ... | ... |

Fig. 3

LEVEL DETERMINATION CONDITION INFORMATION

| ITEM | VALUE | LEVEL |
|---|---|---|
| AMOUNT OF RECEIVED DATA | 80% OF BANDWIDTH | A |
| | 60% OF BANDWIDTH | B |
| | ... | ... |
| AMOUNT OF TRANSMITTED DATA | 80% OF BANDWIDTH | A |
| | 60% OF BANDWIDTH | B |
| | ... | ... |
| NUMBER OF PACKETS IN BUFFER | 90% OF BUFFER | A |
| | 70% OF BUFFER | B |
| | ... | ... |
| NUMBER OF DISCARDED PACKETS | STANDARD DEVIAITON:$3\sigma$ | A |
| | ... | ... |

Fig. 4

MICROBURST DETERMINATION CONDITION INFORMATION

| ITEM NUMBER | AMOUNT OF RECEIVED DATA | AMOUNT OF TRANSMITTED DATA | NUMBER OF PACKETS IN BUFFER | NUMBER OF DISCARDED PACKETS | BURST DETERMINATION |
|---|---|---|---|---|---|
| 1 | A | — | — | — | YES |
| 2 | B | — | A | — | YES |
| 3 | C | C | C | — | NO |
| ... | ... | ... | ... | ... | ... |

INFORMATION PROCESSING APPARATUS, INFORMATION PROCESSING METHOD, AND COMPUTER READABLE MEDIUM

TECHNICAL FIELD

The present invention relates to a technology to determine whether or not microburst traffic has occurred.

BACKGROUND ART

In data centers, crowd services and the like, the phenomenon (burst traffic) may occur where the amount of communication data is boosted momentarily by a concentration of accesses to a server from clients.

If such a phenomenon occurs on a millisecond basis, it is called microburst traffic (hereinafter, referred to also as a "microburst").

Microburst traffic may cause packet loss, delay and the like, leading to a network communication failure.

Among technologies to detect such a microburst are those disclosed in Patent Document 1 and Non-Patent Document 1, for example.

Patent Document 1 introduces a technology to detect a microburst by capturing the packets of a monitored device on a microsecond basis, and aggregating the captured packets on a millisecond or microsecond basis.

Non-Patent Document 1 is designed to detect a microburst by obtaining the state of a monitored device on a millisecond or microsecond basis.

CITATION LIST

Patent Literature

Patent Document 1: JP 2003-244238 A

Non-Patent Literature

Non-Patent Document 1: CorvilNet http://bizex.goo.ne.jp/release/detail/27538/

SUMMARY OF INVENTION

Technical Problem

The method of Patent Document 1, where packets are captured on a microsecond basis and aggregated on a millisecond/microsecond basis, results in heavy network load between a collection device for capturing and a monitored device. This requires an exclusive line to connect the collection device and the monitored device.

The method of Non-Patent Document 1, where the state of a monitored device is acquired on a millisecond/microsecond basis, poses the problem of heavy load on a monitored device because of the extremely short period of time for collection.

A main objective of this invention is to solve problems such as those discussed above. It is a main objective to reduce load required for detecting microburst traffic.

Solution to Problem

An information processing apparatus according to the present invention may include:

a receiving section to receive, from a communication apparatus, aggregate-value information indicating at least one of an aggregate value of a data communication amount obtained by aggregating, per unit of aggregation time of one second or longer, the data communication amount of the communication apparatus which has been measured on a millisecond or microsecond basis, and an aggregate value of a data accumulation amount obtained by aggregating, per unit of the aggregation time, the data accumulation amount of the communication apparatus which has been measured on the millisecond or microsecond basis; and a determining section to analyze at least one of the aggregate value of the data communication amount and the aggregate value of the data accumulation amount indicated in the aggregate-value information to determine whether or not microburst traffic has occurred at the communication apparatus.

Advantageous Effects of Invention

According to the present invention, at least one of the aggregate value of data communication amounts and the aggregate value of data accumulation amounts, which have been obtained by aggregation per unit of aggregation time of one second or longer, is utilized to determine whether or not microburst traffic has occurred. This can contribute to a reduction in load required for detecting microburst traffic.

DESCRIPTION OF EMBODIMENTS

Embodiment 1

This and subsequent embodiments describe configurations for simple microburst detection using the state acquisition on a second/minute basis which is executed in conventional network monitoring such as SNMP (Simple Network Management Protocol).

Figure 1:
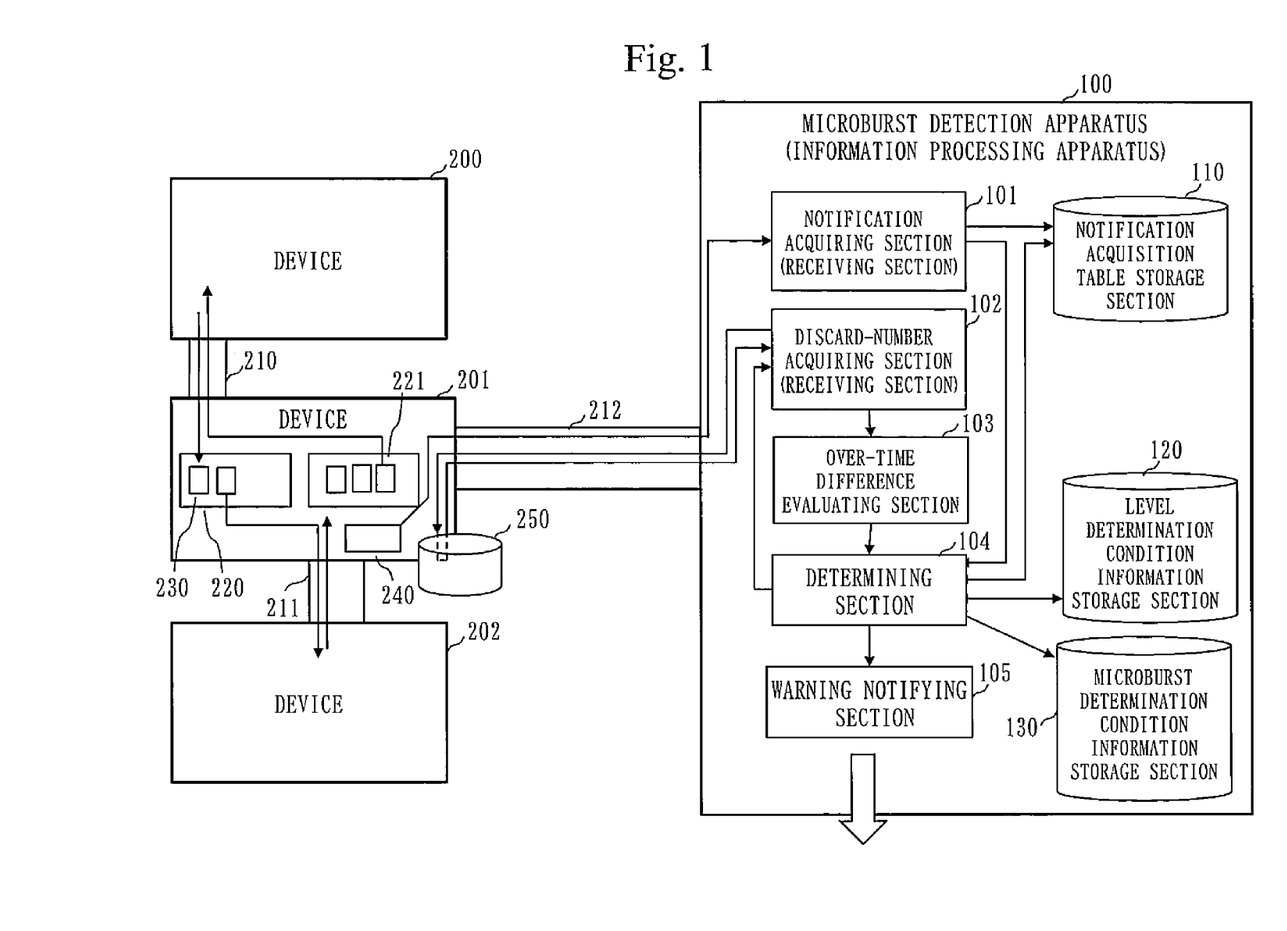
FIG. 1 is a diagram illustrating devices and a microburst detection apparatus, according to a first embodiment.

FIG. 1 illustrates a microburst detection apparatus 100 and devices at which a microburst is detected by the microburst detection apparatus 100, according to the first embodiment.

Referring to FIG. 1, a network device 200, a network device 201 and a network device 202 are devices used in a network system, such as a switch or a router, for example.

Hereinafter, the network device 200, the network device 201 and the network device 202 will be referred to as the device 200, the device 201 and the device 202, respectively.

The device 200, the device 201 and the device 202 correspond to an example of a communication apparatus.

Although FIG. 1 shows three of the devices 200, 201 and 202 alone, the number of the devices is not limited to three.

A cable 210 is the cable to connect the device 200 and the device 201, which may be a LAN (Local Area Network) cable, for example.

A cable 211 is the cable to connect the device 201 and the device 202, which may be a LAN cable, for example.

A cable 212 is the cable to connect the device 201 and the microburst detection apparatus 100, which may be a LAN cable, for example.

Although not shown, the device 200 and the device 202 are likewise connected to the microburst detection apparatus 100 via cables.

Referring to the device 201, a buffer 220 is a storage area for storing packets 230 received from the device 200 via the cable 210.

The packets 230 stored in the buffer 220 are transmitted to the device 202.

A buffer 221 is a storage area for storing packets 230 received from the device 202 via the cable 211.

The packets 230 stored in the buffer 221 are transmitted to the device 200.

Although FIG. 1 shows the buffers 220 and 221 only in the device 201, the devices 200 and 202 are likewise provided with buffers corresponding to the buffers 220 and 221.

Referring further to the device 201, a notification message 240 is the data to notify the microburst detection apparatus 100 of the aggregate value of a predetermined monitor item when the aggregate value has exceeded a threshold.

Specifically, the device 201 measures the amount of data communication (the amount of received data or the amount of transmitted data) in the device 201 on a millisecond or microsecond basis, and aggregates the measurement values per unit of predetermined aggregation time.

The device 201 also measures the amount of accumulated data in the device 201 on a millisecond or microsecond basis, and aggregates the measurement values per unit of the predetermined aggregation time.

Then, the device 201 transmits, to the microburst detection apparatus 100, the notification message 240 notifying of the aggregate value when the aggregate value has exceeded the threshold.

The aggregation time is a period of one second or longer, which may be a period of ten seconds or one minute, for example.

The aggregation value may be a mean value of the measurement values, for example.

The notification message 240 may be an SNMP trap, for example.

A database 250 is the database for logging the state of the device 201, such as a Management information base (MIB).

More specifically, the devices 200 and 202 are also provided with the database 250 each, and transmit the notification message 240 to the microburst detection apparatus 100 when the aggregate value has exceeded the threshold.

The microburst detection apparatus 100 receives the notification message 240 from the device 200, and analyzes the aggregate value indicated by the notification message 240 to determine whether or not a microburst has occurred at the device 200.

The microburst detection apparatus 100 also receives the notification message 240 from the device 201, and analyzes the aggregate value indicated by the notification message 240 to determine whether or not a microburst has occurred at the device 201.

The microburst detection apparatus 100 also receives the notification message 240 from the device 202, and analyzes the aggregate value indicated by the notification message 240 to determine whether or not a microburst has occurred at the device 202.

An example is described below where the microburst detection apparatus 100 determines whether or not a microburst has occurred at the device 201, based on the notification message 240 from the device 201.

The microburst detection apparatus 100 corresponds to an example of an information processing apparatus.

Referring to the microburst detection apparatus 100, a notification acquiring section 101 receives the notification message 240 from the device 201, stores the received notification message 240 in a notification acquisition table storage section 110 and outputs the received notification message 240 to a determining section 104.

The notification message corresponds to an example of aggregate-value information.

The notification acquiring section 101 corresponds to an example of a receiving section, and so does a discard-number acquiring section 102 described below.

Figure 2:
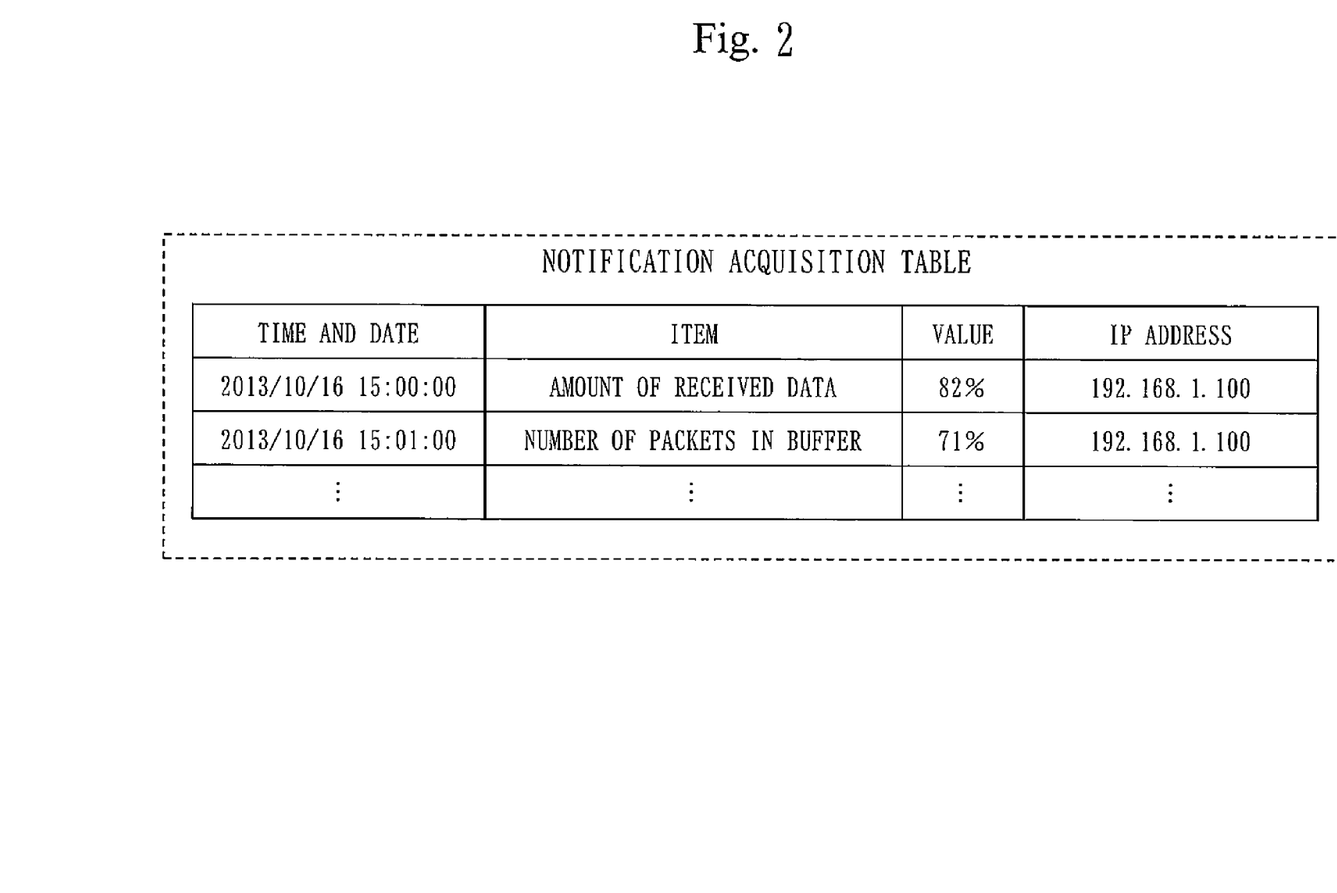
FIG. 2 is a diagram illustrating an example of a notification acquisition table according to the first embodiment.

The notification acquisition table storage section 110 stores a notification acquisition table illustrated in FIG. 2.

The notification acquisition table describes aggregate values indicated in the notification message 240 received from the device 201.

The notification acquisition table is discussed below in detail.

The discard-number acquiring section 102 receives, regularly from the device 201, packet discard-number information indicating the number of discarded packets (a data discard amount) in the device 201, and outputs the received packet discard-number information to a time differential evaluating section 103.

The packet discard-number information also corresponds to an example of the aggregate-value information.

The discard-number acquiring section 102 also corresponds to an example of the receiving section.

The time differential evaluating section 103 stores a period of elapsed time from the reception of the last packet discard-number information, and calculates the number of discarded packets per unit time.

The time differential evaluating section 103 then outputs the number of discarded packets per unit time to the determining section 104.

Figure 3:
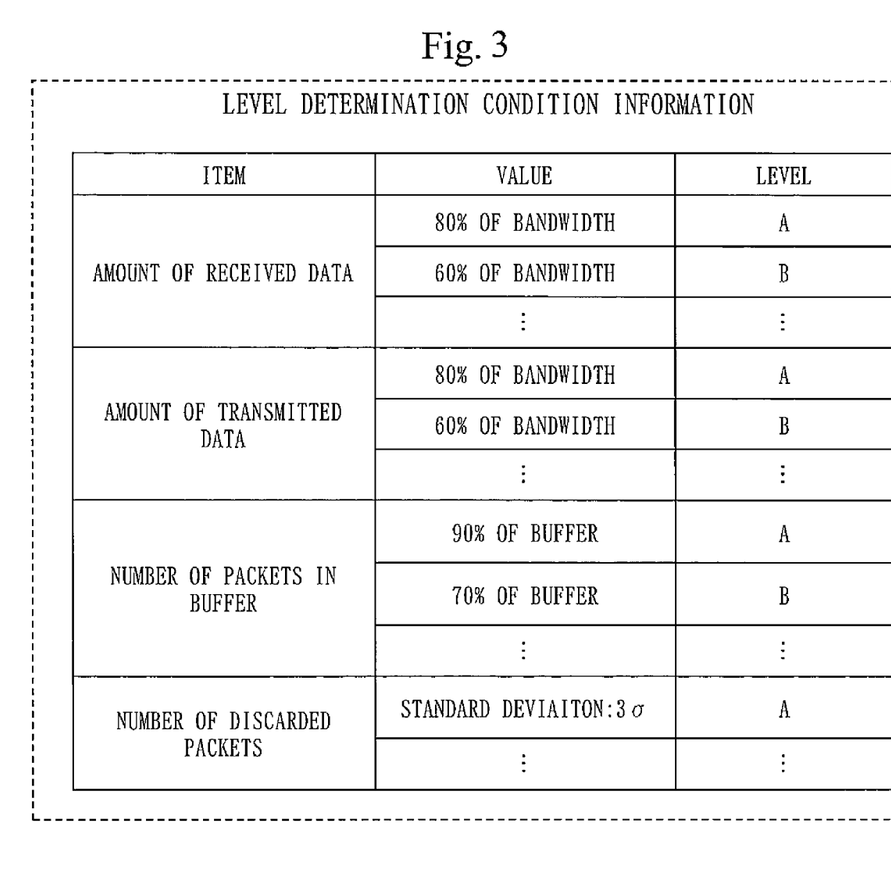
FIG. 3 is a diagram illustrating an example of level determination condition information according to the first embodiment.

A level determination condition information storage section 120 stores level determination condition information illustrated in FIG. 3.

The level determination condition information defines level determination conditions to determine the level of the amount of received data, the level of the amount of transmitted data, the level of the amount of accumulated data, and the level of the number of discarded packets.

The level determination condition information is described below in detail.

Figure 4:
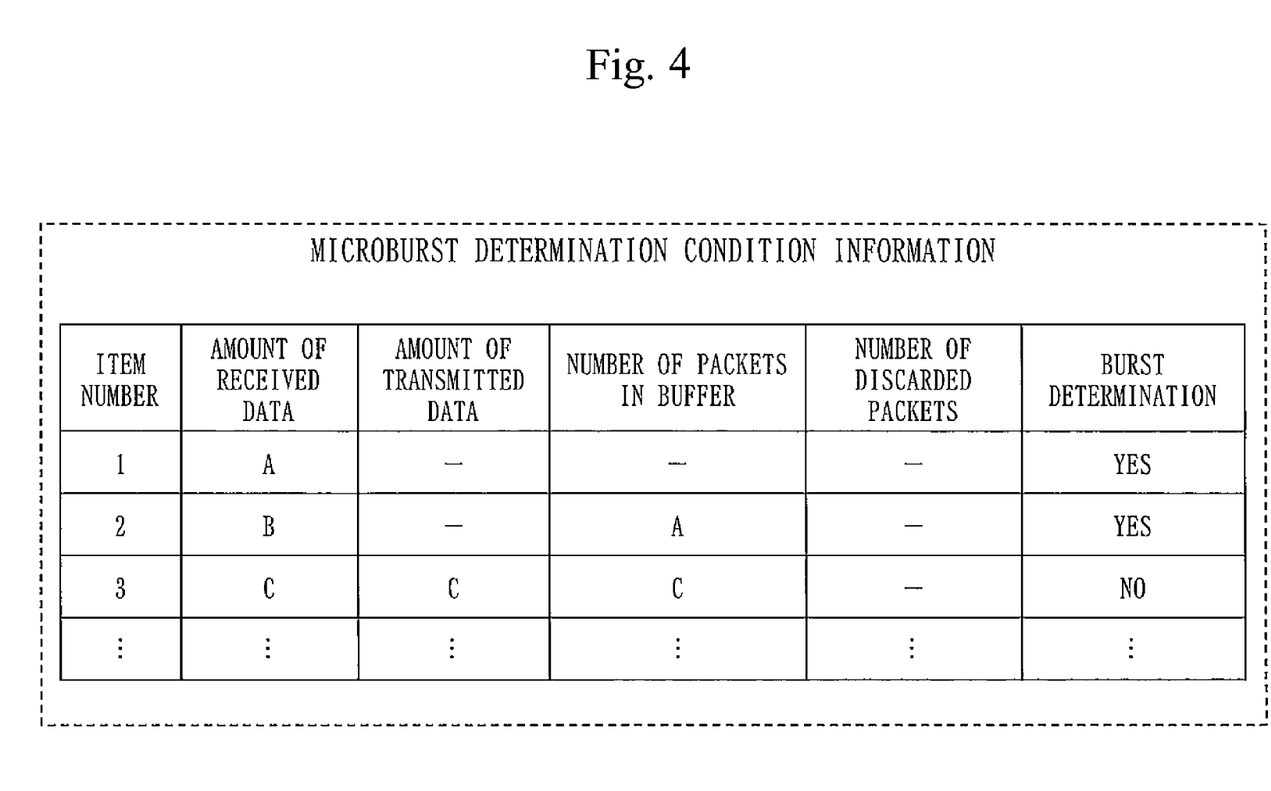
FIG. 4 is a diagram illustrating an example of microburst determination condition information according to the first embodiment.

A microburst determination condition information storage section 130 stores microburst determination condition information illustrated in FIG. 4.

The microburst determination condition information defines a microburst determination condition to determine whether or not a microburst has occurred, based on a combination of the levels of monitor items.

The microburst determination condition information is descried below in detail.

The determining section 104 determines the level with reference to the level determination condition information in the level determination condition information storage section 120, and determines whether or not a microburst has occurred at the device 201, based on the determined level in conjunction with the microburst determination condition information in the microburst determination condition information storage section 130.

Having determined that a microburst has occurred, the determining section 104 notifies a warning notifying section 105 that the microburst has occurred.

The warning notifying section 105, upon notification of the microburst occurrence by the determining section 104, issues warning outside (e.g., to the PC used by the operator).

The notification acquisition table (FIG. 2) is described below in detail.

According to this embodiment, one of the aggregate value of the amounts of received data in the device 201, the aggregate value of the amounts of transmitted data in the device 201, and the aggregate value of the amount of accumulated data in the device 201 is described in each notification message.

In the notification acquisition table, each notification message is assigned a record which contains the information described in the notification message.

Referring to FIG. 2, "time and date" denotes the time and date when the aggregate value exceeding the threshold is obtained in the device 201.

"Item" denotes a monitor item having the aggregate value exceeding the threshold.

The monitor item is the amount of received data, the amount of transmitted data, the amount of accumulated data (the number of accumulated packets in the buffer of the device 201), or the number of discarded packets.

For the amount of received data, the amount of transmitted data and the amount of accumulated data among monitor items, the aggregate value is notified by the notification message 240.

The number of discarded packets is among the monitor items, although the aggregate value for the number of discarded packets is not notified by the notification message.

"Value" denotes a ratio of the aggregate value to a maximum value.

For example, "82%" of a record in the first row denotes that the amount of received data accounts for 82% of the bandwidth assigned to the device 201.

In a record in the second row, "71%" denotes that the amount of accumulated data accounts for 71% of the buffer capacity of the device 201.

"IP address" denotes the IP (Internet Protocol) address of the device 201 as the sender of the notification message.

The level determination condition information (FIG. 3) is described below in detail.

The level determination condition information defines a condition to determine a level for each monitor item (the amount of received data, the amount of transmitted data, the number of accumulated packets in the buffer, the number of discarded packets).

Referring to the "amount of received data", for example, when the aggregate value notified by the notification message 240 accounts for 80% or more of the bandwidth, the level is determined to be "A".

When the aggregate value notified by the notification message 240 accounts for 60% or more and less than 80%, the level is determined to be "B".

Referring to the number of discarded packets in FIG. 3, the level determination condition is defined by a standard deviation, but may be defined by an alternative value.

The level determination condition for the "amount of received data" in FIG. 3 corresponds to an example of a data reception amount level determination condition. The level determination condition for the "amount of transmitted data" corresponds to an example of a data transmission amount level determination condition.

The level determination condition for the "number of accumulated packets in buffer" corresponds to an example of a data accumulation amount level determination condition. The level determination condition for the "number of discarded packets" corresponds to an example of a data discard amount level determination condition.

The microburst determination condition information (FIG. 4) is described below in detail.

The microburst determination condition information defines microburst determination conditions to determine whether or not a microburst has occurred, based on a combination of the levels of monitor items.

Referring to the example of FIG. 4, when the level of the "amount of received data" is "A", then it is determined that a microburst has occurred, regardless of the levels of other monitor items.

When the level of the "amount of received data" is "B", and the level of the "number of accumulated packets in buffer" is "A", then it is determined that a microburst has occurred, regardless of the levels of other monitor items.

When the levels of the "amount of received data", the "amount of transmitted data" and the "number of discarded packets" are all "C", then it is determined that a microburst has not occurred, regardless of the level of the "number of discarded packets".

Although not shown in FIG. 4, it is also possible to define a condition to determine that a microburst has occurred, regardless of the levels of other monitor items, when the level of the "amount of transmitted data" is "A".

Likewise, a condition may be defined to determine that a microburst has occurred, regardless of the levels of other monitor items, when the level of the "number of accumulated packets in buffer" is "A".

An operation according to this embodiment is discussed below.

Packets transmitted from the devices 200 to 201 are held in the buffer 220 in the device 201 for a short time.

The packets held in the buffer 220 are then transmitted sequentially to the device 202 via the cable 211 according to the FIFO (First In First Out).

The device 201 measures the amount of received data, the amount of transmitted data, and the amount of accumulated data (the number of accumulated packets in the buffer 220), and logs the measurement values to the database 250.

The amount of received data, the amount of transmitted data and the amount of accumulated data are the items whose values increase/vary momentarily upon occurrence of a microburst. For this reason, the amount of received data, the amount of transmitted data, and the amount of accumulated data are measured on a millisecond or microsecond basis to detect a microburst, in the device 201.

The device 201 then aggregates, per unit of the aggregation time, the values of the measured amounts of received data, transmitted data, and accumulated data, separately, to obtain aggregate values.

For each of the aggregate values of the amounts of received data, transmitted data, and accumulated data, a threshold is set in the device 201.

The device 201 transmits the notification message 240 at the moment the aggregate value exceeds the threshold in each of the amount of received data, the amount of transmitted data, and the amount of accumulated data.

The notification message 240 contains the time and date of detection of an aggregate value exceeding the threshold, the item whose aggregate value exceeds the threshold, and that aggregate value exceeding the threshold.

If a large amount of packets are received at a time in the device 201, some of the packets may be discarded for want of enough room in the buffer 220.

Such discarded packets are aggregated in the device 201, and logged to the database 250.

The device 201 then regularly transmits, to the microburst detection apparatus 100, the packet discard-number information to notify the number of discarded packets.

The following are two methods for detecting the occurrence of a microburst by the microburst detection apparatus 100.

A first method is a method in which the microburst detection apparatus 100 utilizes the notification message 240 alone from the device 201 to detect a microburst.

A second method is a method in which the microburst detection apparatus 100 utilizes both the notification message 240 and the packet discard number information to detect a microburst.

First, an operation of the microburst detection apparatus 100 based on the first method is discussed with reference to the flow chart of FIG. 7.

As discussed earlier, the device 201 transmits the notification message 240, and the notification acquiring section 101 receives the notification message 240 (S101).

The notification acquiring section 101 stores the notification message 240 in the notification acquisition table of the notification acquisition table storage section 110.

The notification acquiring section 101 also outputs the notification message 240 to the determining section 104.

The determining section 104 receives the notification message 240 from the notification acquiring section 101, and determines the level of the corresponding item, based on the item and aggregate value indicated in the notification message 240 in conjunction with the level determination condition of the level determination condition information (S102).

With the notification message 240 indicating "Item: amount of received data" and "Value: 82%", for example, the determining section 104 determines that the level is "A", as in the first row record in FIG. 2.

The determining section 104 retrieves, from the notification acquisition table, a notification message which describes time and date within a predetermined window time from the time and date described in the notification message 240 received at S101, and which has the same sender as that of the notification message 240 received at S101 (S103).

The window time is any period of time, which may be a period between 10 seconds and one minute, for example.

In this embodiment, one notification message describes the aggregate value of only one monitor item. However, the microburst determination condition is defined by a combination of the levels of a plurality of monitor items, as in FIG. 4.

Thus, an appropriate decision may not be achieved on whether or not a microburst has occurred, based only on the notification message received at S101.

Therefore, the determining section 104 searches in S103 for a notification message describing the aggregate value of any other monitor item.

Having retrieved a notification message at S103, the determining section 104 determines the level of the item indicated in the retrieved notification message, in the same manner as described at S102 (S104).

The determining section 104 then determines whether or not the microburst determination condition defined in the microburst determination condition information is satisfied, based on the levels determined at S102 and S104 (S105).

Having determined that the microburst determination condition is satisfied and consequently a microburst have occurred (YES at S106), the determining section 104 notifies the warning notifying section 105 that the microburst has occurred. The warning notifying section 105 then issues warning of the occurrence of the microburst.

The warning notifying section 105, upon receipt of the notification from the determining section 104, outputs the warning to an externally connected device (e.g., a PC) (S107).

Having determined that the microburst determination condition is not satisfied and consequently a microburst cannot have occurred (NO at S106), the determining section 104 terminates processing.

Figure 8:
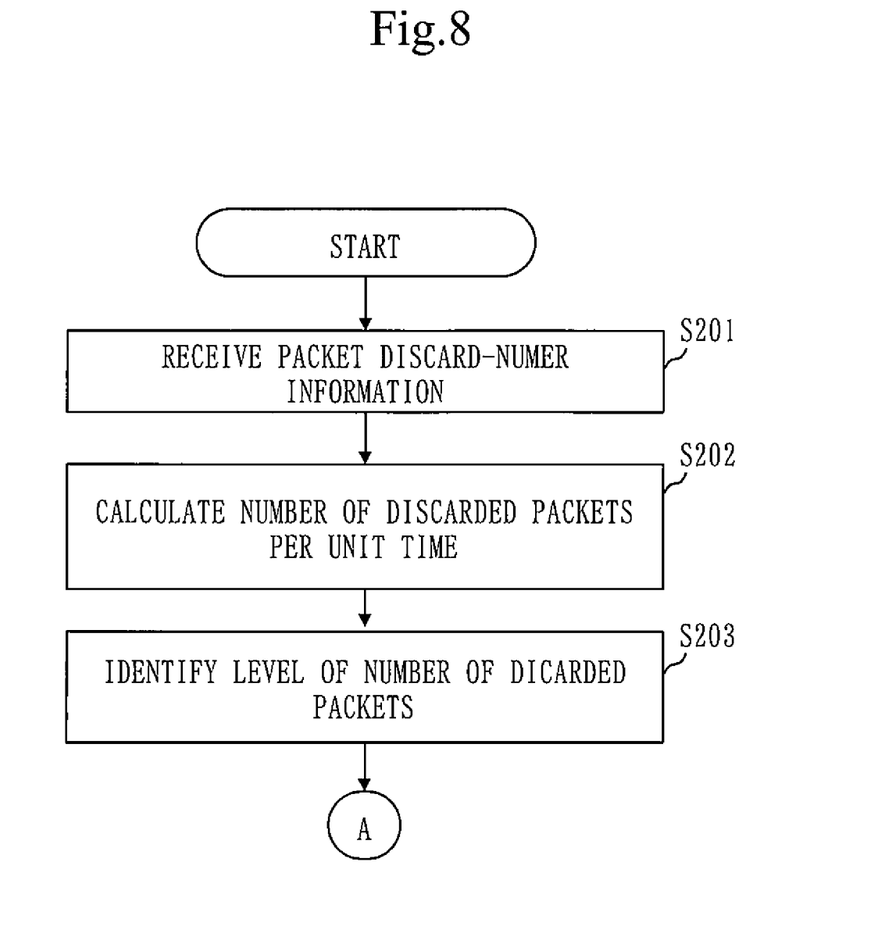
FIG. 8 is a flow chart illustrating another example of the operation of the microburst detection apparatus according to the first embodiment.

An operation of the microburst detection apparatus 100 based on the second method is discussed below with reference to the flow chart of FIG. 8.

First, the discard-number acquiring section 102 receives the packet discard-number information from the device 201 (S201), and outputs the received packet discard-number information to the time differential evaluating section 103.

Then, the time differential evaluating section 103 calculates the value of the number of discarded packets, per unit time (S202).

More specifically, the time differential evaluating section 103 calculates a differential value between the value of the number of discarded packets in the packet discard-number information received at step S201 and the value of the number of discarded packets in the packet discard-number information, and divides the differential value by the elapsed time to determine the number of discarded packets per unit time.

The time differential evaluating section 103 then outputs the number of discarded packets per unit time to the determining section 104.

Then, the determining section 104 determines the level of the number of discarded packets, based on the number of discarded packets per unit time and the level determination condition of the level determination condition information (S203).

Figure 7:
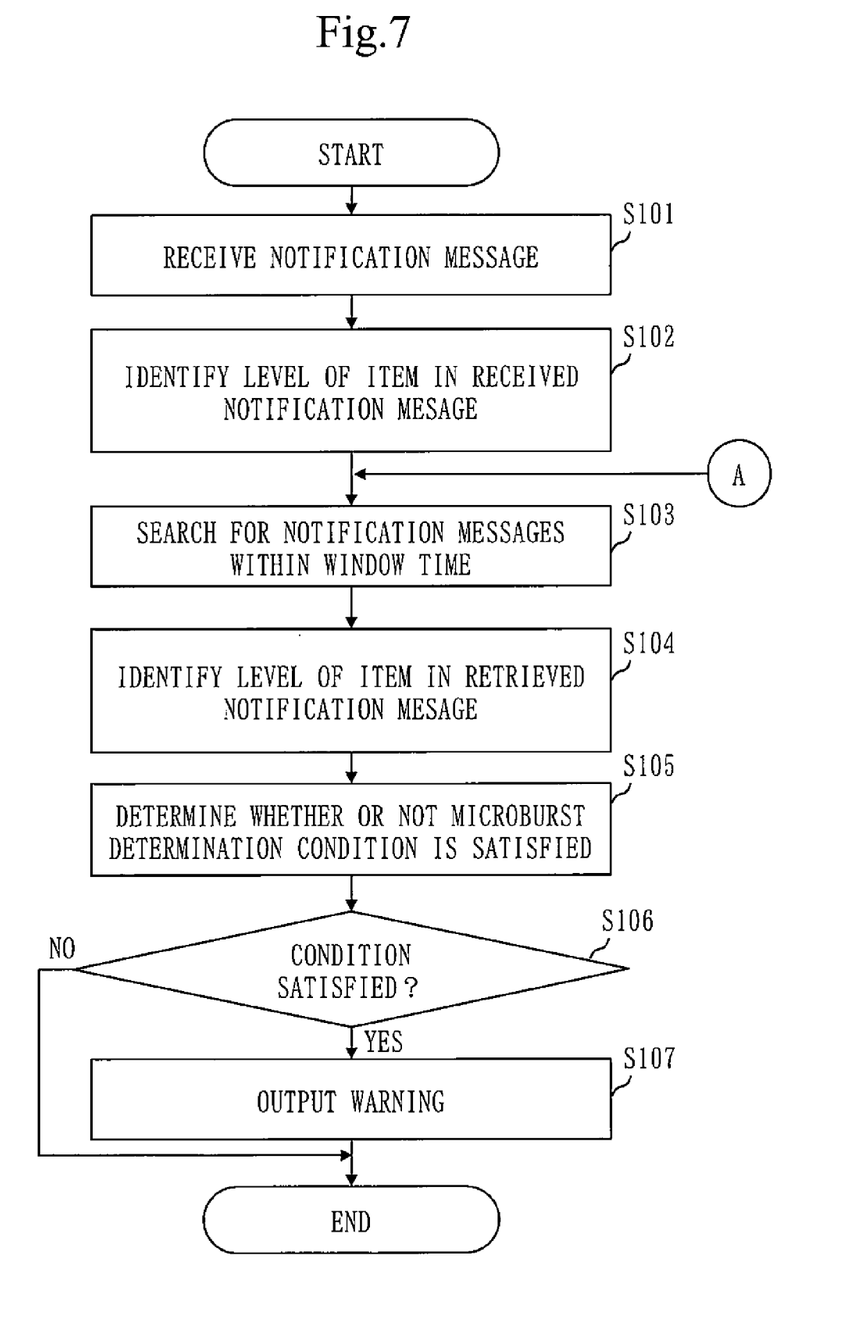
FIG. 7 is a flow chart illustrating an example of the operation of the microburst detection apparatus according to the first embodiment.

The process of S103 and the subsequent processes in FIG. 7 then follow.

Specifically, the determining section 104 retrieves, from the notification acquisition table, a notification message which describes time and date within the window time from the time and date described in the packet discard-number information received at S201 and which has the same sender as that of the packet discard-number information received at S201 (S103).

The determining section 104 also determines the level of the item described in the communication message retrieved at S103, in the same manner as described at S102 (S104).

The determining section 104 then determines whether or not the microburst determination condition is satisfied (S105). When the microburst determination condition is satisfied (YES at S106), the determining section 104 notifies the warning notifying section 105 of the occurrence of a microburst, and the warning notifying section 105 issues a notification of the occurrence of the microburst.

Specifically, the warning notifying section 105, upon receipt of the notification from the determining section 104, outputs the warning to an externally connected device (e.g., a PC) (S107).

An example of burst determination performed by the determining section 104 is described.

It is assumed that when the level determination condition information of FIG. 2 and the microburst determination condition information of FIG. 3 are in use, the notification message received at S101 indicates that the value of the "amount of received data" accounts for "70% of the bandwidth", and the notification message retrieved at S103 indicates that the value of the "number of accumulated packets in buffer" accounts for "95% of the buffer", for example.

In this instance, the determining section 104 determines, with reference to the level determination condition information (FIG. 2), that the level of the "amount of received data" is "B", and the level of the "number of accumulated packets in buffer" is "A".

Then, the determining section 104 determines, with reference to the microburst determination condition information (FIG. 3), that the level of the "amount of received data" and the level of the "number of accumulated packets in buffer" satisfy the determination condition of the record of item 2.

Since the "burst determination" in the item 2 record is set to "YES" (burst occurred), the determining section 104 determines that a microburst has occurred.

Thus, according to this embodiment, a microburst may be detected by receiving, via the SNMP trap, the amount of received data, the amount of transmitted data, and the number of accumulated packets in the buffer, the values of which will become valid momentarily upon occurrence of a microburst, and by evaluating the received values.

Further, according to this embodiment, if the SNMP-trap based evaluation fails to detect a microburst, the evaluation of the number of discarded packets is available for microburst detection. This contributes to improved accuracy in detecting a microburst.

In the above discussion, one notification message describes the aggregate value of only one monitor item. Alternatively, one notification message may describe the aggregate values of a plurality of monitor items.

Embodiment 2

In the first embodiment, the microburst detection apparatus 100 regularly receives the packet discard-number information describing the number of discarded packets. In this embodiment, however, the microburst detection apparatus 100 receives the notification message describing the number of discarded packets to detect a microburst.

In the following discussion, a description is given of differences from the first embodiment.

Portions not discussed below are considered the same as those discussed in the first embodiment.

Figure 5:
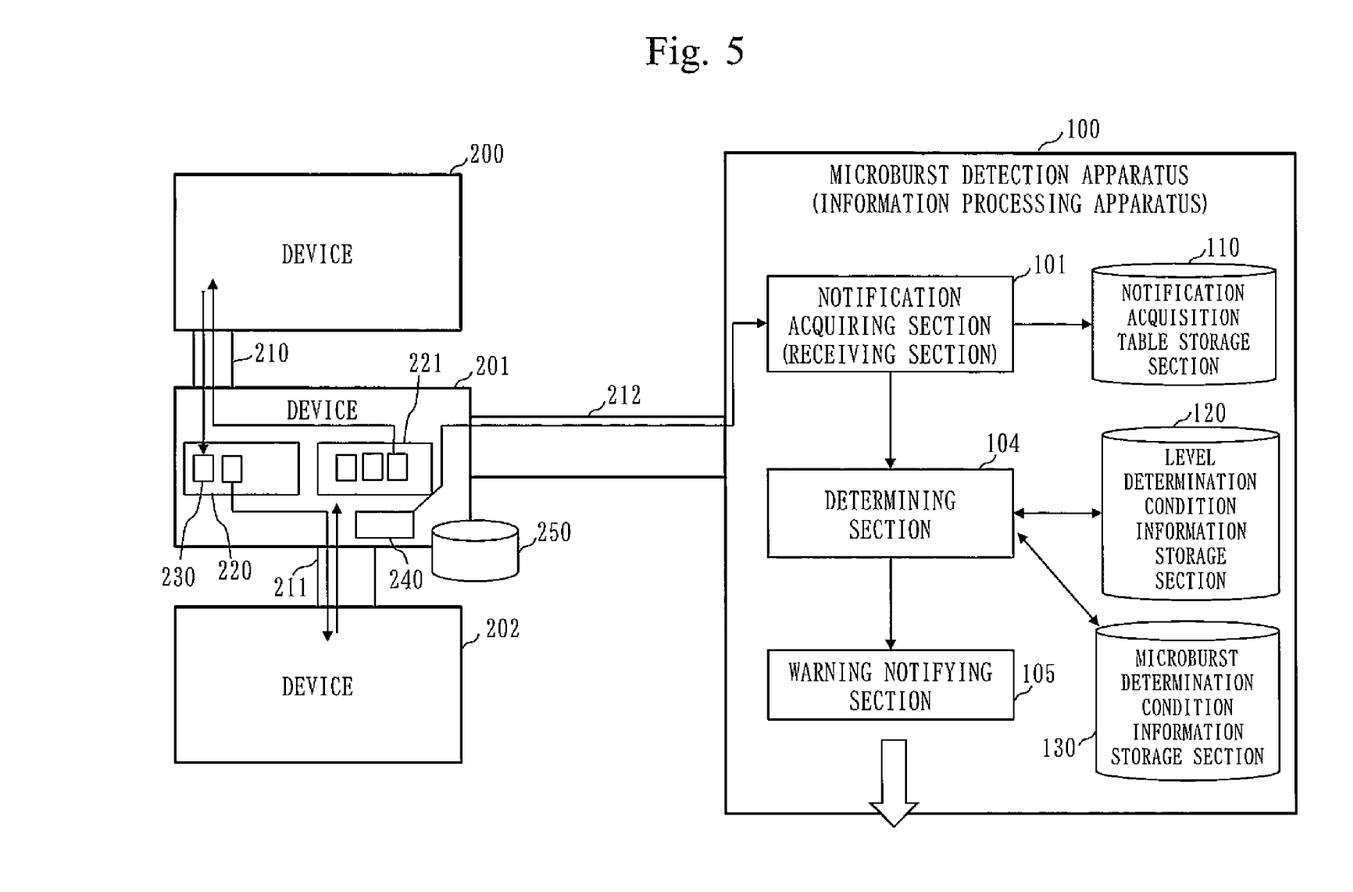
FIG. 5 is a diagram illustrating devices and a microburst detection apparatus, according to a second embodiment.

FIG. 5 illustrates an example of the configuration of the microburst detection apparatus 100 of this embodiment.

In this embodiment, all the values including the number of discarded packets are acquired via notification messages (SNMP trap), which eliminates the need for the discard-number acquiring section 102 and the time differential evaluating section 103 shown in FIG. 1.

Further, according to this embodiment, a threshold relating to the number of discarded packets is set in the device 201

The microburst detection apparatus 100 determines whether or not a microburst has occurred, based on the first method (FIG. 7) described in the first embodiment.

Thus, according to this embodiment, a microburst may be detected if items are all received via notification messages.

Embodiment 3

In the second embodiment, the values of items are all notified via notification messages. This embodiment, however, discusses a configuration where the value of each item is notified via a log from a device, instead of via the notification message.

More specifically, the microburst detection apparatus 100 collects logs regularly from the device 201, and evaluates the logs in detail to determine whether or not a microburst has occurred.

In the following discussion, a description is given of differences from the first embodiment.

Portions not discussed below are considered the same as those described in the first embodiment.

Figure 6:
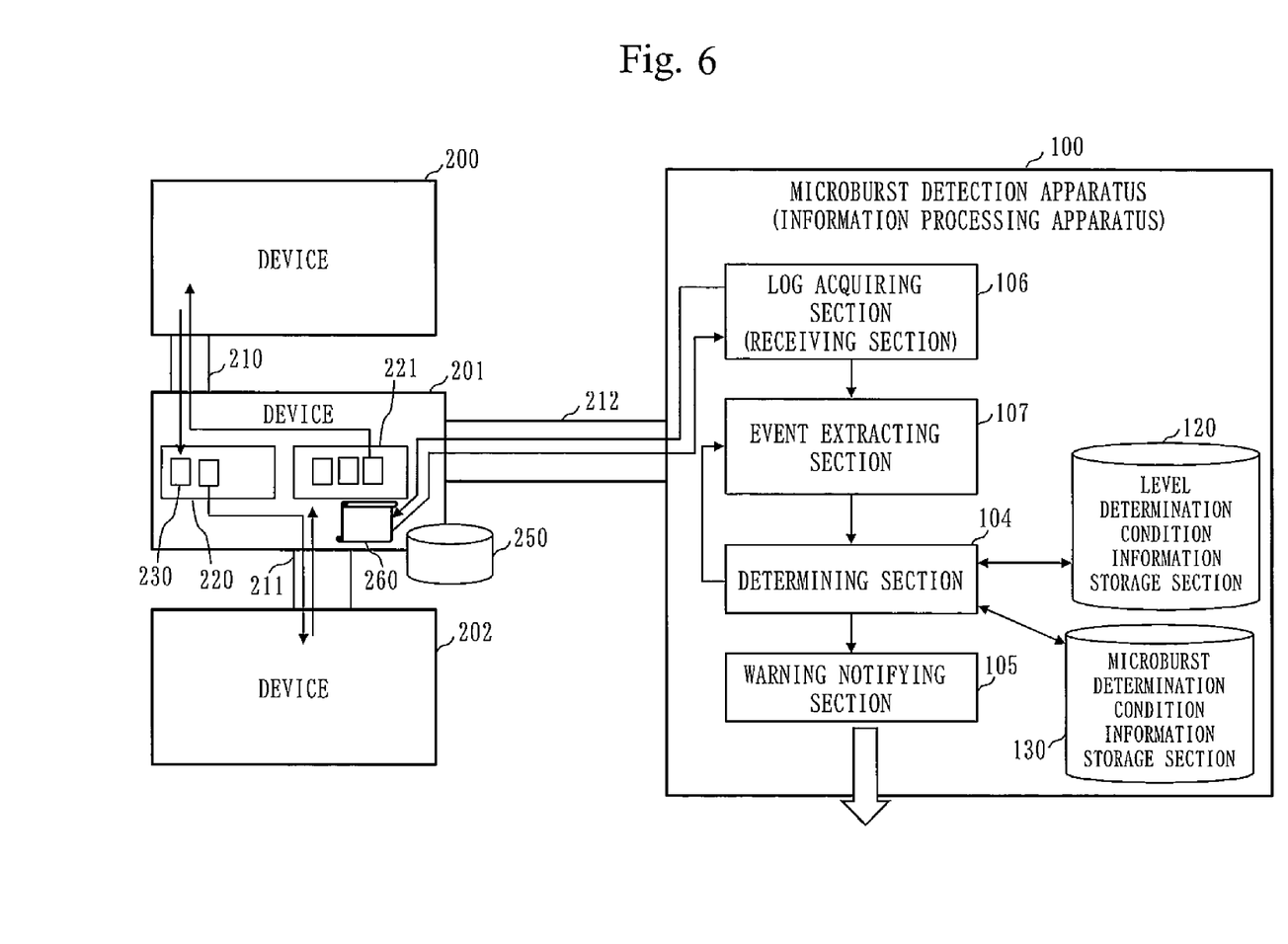
FIG. 6 is a diagram illustrating devices and a microburst detection apparatus, according to a third embodiment.

FIG. 6 illustrates an example of the configuration of the microburst detection apparatus 100 according to this embodiment.

A log acquiring section 106 collects logs from devices.

In this embodiment, the log acquiring section 106 corresponds to an example of the receiving section.

An event extracting section 107 stores elapsed time from the acquisition of the last log, and extracts a difference between the last log acquired and a currently acquired log.

Information extracted by the event extracting section 107 describes the same content as that described in the notification message discussed in the first embodiment.

The device 201 measures the value of each monitor item (the amount of received data, the amount of transmitted data, the amount of accumulate data, the amount of discarded data) on a millisecond or microsecond basis, and determines the aggregate value, per unit of the aggregation time, in the same manner as the first embodiment.

When the aggregate value has exceeded the threshold, the device 201 records to a log 260 the item having the aggregate value exceeding the threshold and that aggregate value.

Thus, the device 201 of this embodiment performs recording to the log 260, instead of transmitting the notification message according to the first embodiment.

An operation of this embodiment is discussed below.

As discussed earlier, the device 201 measures the value of each monitor item (the amount of received data, the amount of transmitted data, the amount of accumulated data, the amount of discarded data) on a millisecond or microsecond basis, determines the aggregate value per unit of the aggregation time, and when the aggregate value has exceeded the threshold, records the item having the aggregate value exceeding the threshold and that aggregate value to the log 260.

In the microburst detection apparatus 100, the log acquiring section 106 acquires the log 260 of the device 201, periodically.

The log acquiring section 106 then outputs the acquired log 260 to the event extracting section 107.

The event extracting section 107 calculates a difference between the currently acquired log and the last log acquired, and extracts the difference as a new event generated.

The event extracting section 107 generates information indicating a portion of the extracted difference.

Specifically, the event extracting section 107 generates information including time and date, an item, a value, and an IP address, as shown in FIG. 2.

The event extracting section 107 then outputs the generated information to the determining section 104.

The processes of S102 to S107 of FIG. 7 then follow.

The processes of S102 to S107 are the same as those described in the first embodiment, and will not be described.

Thus, according to this embodiment, a microburst may be detected via logs in a device, instead of via notification messages.

A UDP (User Datagram Protocol) based transmission of a notification message, for example, may result in a failure to receive the notification message. The use of the log solves this problem.

Lastly, an example of the hardware configuration of the microburst detection apparatus 100 described in any one of the first to third embodiments is discussed with reference to FIG. 9.

The microburst detection apparatus 100 is a computer. Each element of the microburst detection apparatus 100 may be implemented by a program.

Referring to the hardware configuration of the microburst detection apparatus 100, an arithmetic unit 901, an external storage unit 902, a main storage unit 903, a communication unit 904, and an input/output unit 905 are connected to a bus.

The arithmetic unit 901 is a CPU (Central Processing Unit) to execute programs.

The external storage unit 902 is a ROM (Read Only Memory), a flash memory, or a hard disk drive, for example.

The "storage sections" are implemented by the external storage unit 902, for example.

The main storage unit 903 is a RAM (Random Access Memory).

The notification acquiring section 101, the discard-number acquiring section 102, and the log acquiring section 106 acquire information from the device 201 via the communication unit 904.

The input/output unit 905 is a mouse, a keyboard, a display unit or the like, for example.

Programs are usually stored in the external storage unit 902, and loaded to the main storage unit 903 to be read and executed sequentially by the processing unit 901.

Programs implement the functions of the "sections" shown in FIG. 1 (except for the "storage sections", which also applies hereinafter).

The external storage unit 902 also stores an operation system (OS). At least part of the OS is loaded to the main storage unit 903. The processing unit 901 executes programs to implement the functions of the "sections" in FIG. 1 while executing the OS.

The main storage unit 903 also stores, as files, information, data, signal values, and variable values, which indicate the results of processing described as "determination", "judgment", "acquisition", "detection", "extraction", "analysis", "setting", "retrieval", "selection", "generation", "calculation", "inputting", "outputting" and the like.

It is also possible to store, as files, in the main storage unit 903, cipher/decipher keys, random-number values, and parameters.

Figure 9:
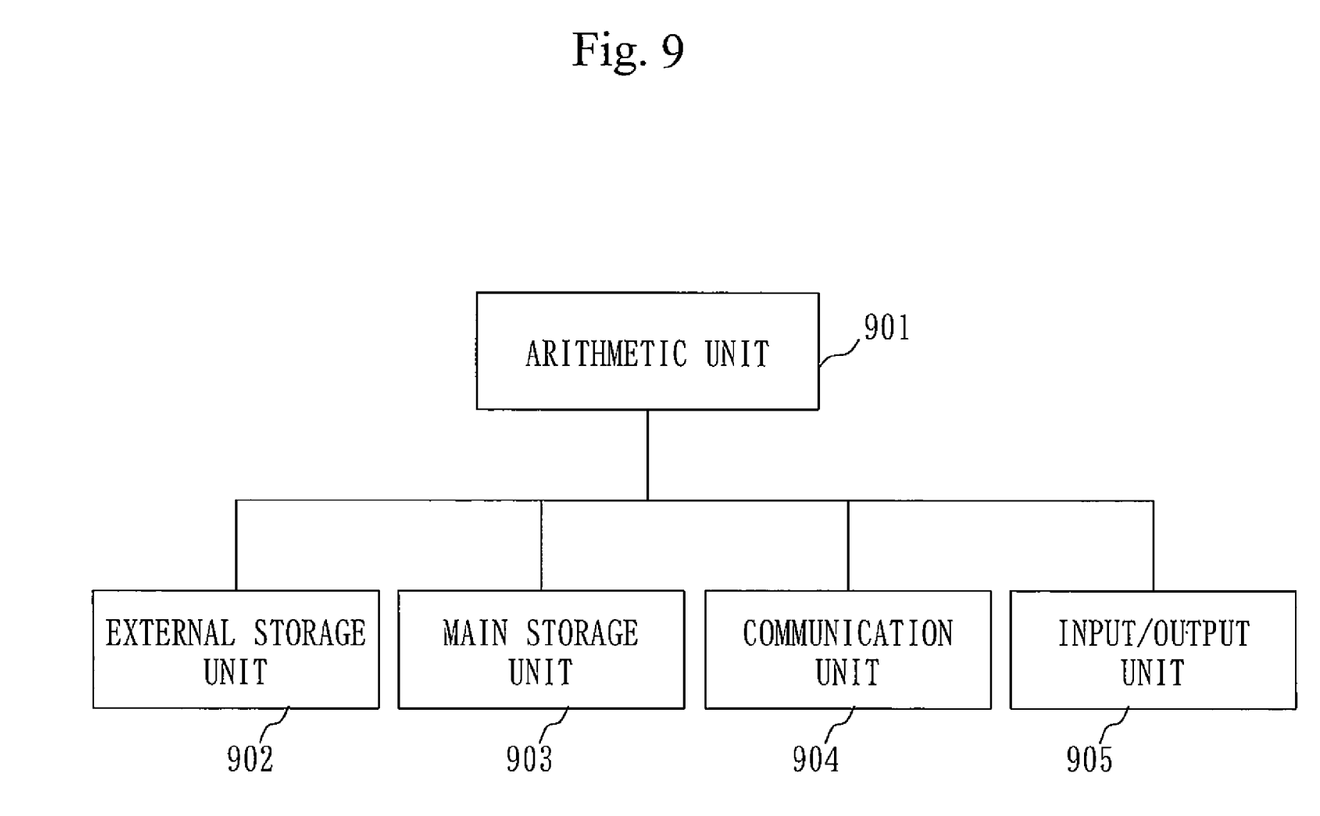
FIG. 9 is a diagram illustrating an example of the hardware configuration of the microburst detection apparatus described in any one of the first to third embodiments.

The FIG. 9 configuration is only an example of the hardware configuration of the microburst detection apparatus 100. The microburst detection apparatus 100 is not only of the FIG. 9 configuration but also of a different configuration.

Further, an information processing method according to this invention may be achieved based on the procedures discussed in any one of the first to third embodiments.

REFERENCE SIGNS LIST 100 microburst detection apparatus
101 notification acquiring section
102 discard-number acquiring section
103 time differential evaluating section
104 determining section
105 warning notifying section
106 log acquiring section
107 event extracting section
110 notification acquisition table storage section
120 level determination condition information storage section
130 microburst determination condition information storage section
200 device
201 device
202 device

The invention claimed is:

1. An information processing apparatus comprising:
processing circuitry:
to receive, from a communication apparatus connected to the information processing apparatus via a network, a notification message including aggregate-value information indicating at least one of:
an aggregate value of a data communication amount obtained by the communication apparatus aggregating, per unit of aggregation time of one second or longer, the data communication amount of the communication apparatus which has been measured on a millisecond or microsecond basis, and
an aggregate value of a data accumulation amount obtained by the communication apparatus aggregating, per unit of the aggregation time, the data accumulation amount of the communication apparatus which has been measured on the millisecond or microsecond basis; and
to analyze at least one of the received aggregate value of the data communication amount and the received aggregate value of the data accumulation amount indicated in the aggregate-value information, to determine whether or not microburst traffic has occurred at the communication apparatus.

2. The information processing apparatus of claim 1, wherein the processing circuitry:
stores level determination condition information indicating a data communication amount level determination condition to determine a level of the data communication amount, and a data accumulation amount level determination condition to determine a level of the data accumulation amount;
stores microburst determination condition information which defines a microburst determination condition to determine whether or not the microburst traffic has occurred, based on at least one of the level of the data communication amount and the level of the data accumulation amount;

when the aggregate-value information indicates the aggregate value of the data communication amount,
determines the level of the data communication amount, based on the data communication amount level determination condition and the aggregate value of the data communication amount, and
determines whether or not the microburst traffic has occurred at the communication apparatus, based on the determined level of the data communication amount and the microburst determination condition; and when the aggregate-value information indicates the aggregate value of the data accumulation amount,
determines the level of the data accumulation amount, based on the data accumulation amount level determination condition and the aggregate value of the data accumulation amount, and
determines whether or not the microburst traffic has occurred at the communication apparatus, based on the determined level of the data accumulation amount and the microburst determination condition.

3. The information processing apparatus of claim 2, wherein the processing circuitry:
stores the microburst determination condition information which defines the microburst determination condition, based on a combination of the level of the data communication amount and the level of the data accumulation amount; and
when the aggregate-value information indicating the aggregate value of the data communication amount and the aggregate-value information indicating the aggregate value of the data accumulation amount are received within prescribed window time,
determines the level of the data communication amount, based on the data communication amount level determination condition and the aggregate value of the data communication amount,
determines the level of the data accumulation amount, based on the data accumulation amount level determination condition and the aggregate value of the data accumulation amount, and
determines whether or not the microburst traffic has occurred at the communication apparatus, based on a combination of the determined level of the data communication amount and the determined level of the data accumulation amount, and the microburst determination condition.

4. The information processing apparatus of claim 3, wherein the processing circuitry:
receives the aggregate-value information indicating, as the aggregate value of the data communication amount in the communication apparatus, at least one of:
an aggregate value of data reception amount obtained by aggregating, per unit of the aggregation time, the data reception amount of the communication apparatus which has been measured on the millisecond or microsecond basis, and
an aggregate value of a data transmission amount obtained by aggregating, per unit of the aggregation time, the data transmission amount of the communication apparatus which has been measured on the millisecond or microsecond basis;
stores the level determination condition information which indicates, as the data communication amount level determination condition, a data reception amount level determination condition to determine a level of a data reception amount, and a data transmission amount level determination condition to determine a level of a data transmission amount;
stores the microburst determination condition information which defines the microburst determination condition, based on a combination of the level of the data reception amount, the level of the data transmission amount, and the level of the data accumulation amount; and
when the aggregate-value information indicating the aggregate value of the data reception amount, the aggregate-value information indicating the aggregate value of the data transmission amount and the aggregate-value information indicating the aggregate value of the data accumulation amount are received within the window time,
determines the level of the data reception amount, based on the data reception amount level determination condition and the aggregate value of the data reception amount,
determines the level of the data transmission amount, based on the data transmission amount level determination condition and the aggregate value of the data transmission amount, and
determines whether or not the microburst traffic has occurred at the communication apparatus, based on a combination of the determined level of the data reception amount, the determined level of the data transmission amount and the determined level of the data accumulation amount, and the microburst determination condition.

5. The information processing apparatus of claim 2, wherein the processing circuitry:
receives the aggregate-value information which indicates an aggregate value of a data discard amount of the communication apparatus;
stores the level determination condition information which indicates a data discard amount level determination condition to determine a level of a data discard amount;
stores the microburst determination condition information which defines the microburst determination condition, based on a combination of a level of the data discard amount and at least one of the level of the data communication amount and the level of the data accumulation amount; and
when the aggregate-value information indicating the aggregate value of the data discard amount, and the aggregate-value information indicating at least one of the aggregate value of the data communication amount and the aggregate value of the data accumulation amount are received within the prescribed window time,
determines the level of the data discard amount, based on the data discard amount level determination condition and the aggregate value of the data discard amount, and
determines whether or not the microburst traffic has occurred at the communication apparatus, based on a combination of a determined level of the data discard amount and at least one of the level of the data communication amount and the level of the data accumulation amount, and the microburst determination condition.

6. The information processing apparatus of claim 1, wherein the processing circuitry receives the aggregate-value information indicating at least one of the aggregate value of the data communication amount which has exceeded a threshold, and the aggregate value of the data accumulation amount which has exceeded a threshold.

7. An information processing method comprising:
- receiving, from a communication apparatus connected to an information processing device via a network, a notification messages including aggregate-value information which indicates at least one of:
  - an aggregate value of a data communication amount obtained by the communication apparatus aggregating, per unit of aggregation time of one second or longer, the data communication amount of the communication apparatus which has been measured on a millisecond or microsecond basis, and
  - an aggregate value of a data accumulation amount obtained by the communication apparatus aggregating, per unit of the aggregation time, the data accumulation amount of the communication apparatus which has been measured on the millisecond or microsecond basis; and
- analyzing, by the information processing device, at least one of the received aggregate value of the data communication amount and the received aggregate value of the data accumulation amount indicated by the aggregate-value information, to determine, by the information processing device, whether or not microburst traffic has occurred at the communication apparatus.

8. A non-transitory computer readable medium having stored thereon a program causing a computer to execute:
- a reception process to receive, from a communication apparatus connected to an information processing device via a network, a notification message including aggregate-value information indicating at least one of:
  - an aggregate value of a data communication amount obtained by the communication apparatus aggregating, per unit of aggregation time of one second or longer, the data communication amount of the communication apparatus which has been measured on a millisecond or microsecond basis, and
  - an aggregate value of a data accumulation amount obtained by the communication apparatus aggregating, per unit of the aggregation time, the data accumulation amount of the communication apparatus which has been measured on the millisecond or microsecond basis; and
- a determination process to analyze at least one of the received aggregate value of the data communication amount and the received aggregate value of the data accumulation amount indicated in the aggregate-value information, to determine, by the information processing device, whether or not microburst traffic has occurred at the communication apparatus.

* * * * *